(12) United States Patent
Gurumoorthy et al.

(10) Patent No.: US 12,402,197 B2
(45) Date of Patent: Aug. 26, 2025

(54) MULTI-SIM SCHEDULING GAPS

(71) Applicant: Apple Inc., Cupertino, CA (US)

(72) Inventors: Sethuraman Gurumoorthy, San Ramon, CA (US); Alexander Sirotkin, Hod Hasharon (IL); Birgit Breining, Munich (DE); Fangli Xu, Beijing (CN); Haijing Hu, Los Gatos, CA (US); Naveen Kumar R. Palle Venkata, San Diego, CA (US); Pavan Nuggehalli, San Carlos, CA (US); Ralf Rossbach, Munich (DE); Sarma V. Vangala, Campbell, CA (US); Srirang A Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/759,816

(22) PCT Filed: Aug. 5, 2021

(86) PCT No.: PCT/CN2021/111011
§ 371 (c)(1),
(2) Date: Jul. 29, 2022

(87) PCT Pub. No.: WO2023/010453
PCT Pub. Date: Feb. 9, 2023

(65) Prior Publication Data
US 2024/0215101 A1 Jun. 27, 2024

(51) Int. Cl.
*H04W 76/27* (2018.01)
*H04W 8/18* (2009.01)

(52) U.S. Cl.
CPC ........... *H04W 76/27* (2018.02); *H04W 8/183* (2013.01)

(58) Field of Classification Search
CPC ..... H04W 76/27; H04W 8/183; H04W 76/28; H04W 72/20
(Continued)

(56) References Cited

U.S. PATENT DOCUMENTS

| 2012/0190362 A1 | 7/2012 | Subbarayudu et al. |
| 2013/0210421 A1 | 8/2013 | Mohseni et al. |

(Continued)

FOREIGN PATENT DOCUMENTS

| CN | 107005916 | 8/2017 |
| CN | 108696884 | 10/2018 |

(Continued)

*Primary Examiner* — Rownak Islam
(74) *Attorney, Agent, or Firm* — Fay Kaplun & Marcin, LLP

(57) ABSTRACT

A user equipment (UE) is configured to enter a radio resource control (RRC) CONNECTED state on a first network using a first subscriber identification module (SIM) and an RRC INACTIVE or RRC IDLE state on a second network using a second SIM, transmit, to the first network, a request for a scheduling gap (SG) configuration, wherein, during a duration of the SG, the first network avoids scheduling resources for the UE, receive, from the first network, an indication of the SG configuration to be used, during the duration of the SG, tune away from the first network to perform operations on the second network and after the duration of the SG, tune back to the first network, wherein the RRC CONNECTED state is maintained on the first network during the duration of the SG.

18 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0249408 A1 | 8/2016 | Thiruvenkatachari et al. | |
| 2017/0251353 A1 | 8/2017 | Pinheiro et al. | |
| 2018/0288732 A1 | 10/2018 | Balasubramaniam et al. | |
| 2019/0174548 A1* | 6/2019 | Jiang | H04W 52/02 |
| 2021/0120524 A1 | 4/2021 | Palle et al. | |
| 2022/0110106 A1* | 4/2022 | Kiilerich Pratas | H04W 72/046 |
| 2022/0225377 A1* | 7/2022 | Kim | H04W 52/0216 |
| 2023/0262452 A1* | 8/2023 | Yao | H04W 8/22 370/328 |
| 2024/0015616 A1* | 1/2024 | Wang | H04W 36/00837 |
| 2024/0260121 A1* | 8/2024 | Bae | H04W 76/27 |

FOREIGN PATENT DOCUMENTS

| | | |
|---|---|---|
| CN | 112218310 | 1/2021 |
| WO | 2016/191916 | 12/2016 |
| WO | 2020/197695 | 10/2020 |
| WO | 2020/248733 | 12/2020 |
| WO | 2021/025491 | 2/2021 |

\* cited by examiner

MULTI-SIM SCHEDULING GAPS

TECHNICAL FIELD

This application relates generally to wireless communication, and in particular relates to Multi-SIM Scheduling Gaps.

BACKGROUND

A user equipment (UE) may be equipped with multiple subscriber identification modules (SIMs) and each SIM may enable the UE to establish an independent network connection. Thus, a multi-SIM UE may establish a first network connection using a first SIM and a second network connection using a second SIM.

During multi-SIM operation, the UE may be currently performing operations in the radio resource control (RRC) Connected state with a first network while remaining in an idle or inactive state with a second network. The UE may temporarily switch its operations from the first network to the second network, for example, to listen for paging messages or receive system information from the second network, perform a public land mobile network (PLMN) search, cell recovery, or any other user-triggered protocol activity.

SUMMARY

Some exemplary embodiments are related to a processor of a user equipment (UE) configured to perform operations. The operations include entering a radio resource control (RRC) CONNECTED state on a first network using a first subscriber identification module (SIM) and an RRC INACTIVE or RRC IDLE state on a second network using a second SIM, transmitting, to the first network, a request for a scheduling gap (SG) configuration, wherein, during a duration of the SG, the first network avoids scheduling resources for the UE, receiving, from the first network, an indication of the SG configuration to be used, during the duration of the SG, tuning away from the first network to perform operations on the second network and after the duration of the SG, tuning back to the first network, wherein the RRC CONNECTED state is maintained on the first network during the duration of the SG.

Other exemplary embodiments are related to a processor of a user equipment (UE) configured to perform operations. The operations include entering a radio resource control (RRC) CONNECTED state on a first network using a first subscriber identification module (SIM) and an RRC INACTIVE or RRC IDLE state on a second network using a second SIM, transmitting, to the first network, an indication of a capability for a scheduling gap (SG) configuration, wherein, during a duration of the SG, the first network avoids scheduling resources for the UE, receiving, from the first network, an indication of the SG configuration to be used, during the duration of the SG, tuning away from the first network to perform operations on the second network and after the duration of the SG, tuning back to the first network, wherein the RRC CONNECTED state is maintained on the first network during the duration of the SG.

Still further exemplary embodiments are related to a processor of a base station of a first network configured to perform operations. The operations include entering a radio resource control (RRC) CONNECTED state with a user equipment, wherein the UE uses a first subscriber identification module (SIM) to access the first network, wherein the UE further enters an RRC INACTIVE or RRC IDLE state on a second network using a second SIM, receiving, from the UE, a request for a scheduling gap (SG) configuration, wherein, during a duration of the SG, the first network avoids scheduling resources for the UE, transmitting, to the UE, an indication of the SG configuration to be used, wherein, during the duration of the SG, the UE tunes away from the first network to perform operations on the second network and maintaining the RRC CONNECTED state with the UE during the duration of the SG.

Additional exemplary embodiments are related to a processor of a base station of a first network configured to perform operations. The operations include entering a radio resource control (RRC) CONNECTED state with a user equipment, wherein the UE uses a first subscriber identification module (SIM) to access the first network, wherein the UE further enters an RRC INACTIVE or RRC IDLE state on a second network using a second SIM, receiving, from the UE, an indication of a capability for a scheduling gap (SG) configuration, wherein, during a duration of the SG, the first network avoids scheduling resources for the UE, transmitting, to the UE, an indication of the SG configuration to be used, wherein, during the duration of the SG, the UE tunes away from the first network to perform operations on the second network and maintaining the RRC CONNECTED state with the UE during the duration of the SG.

DETAILED DESCRIPTION

Figure 1:
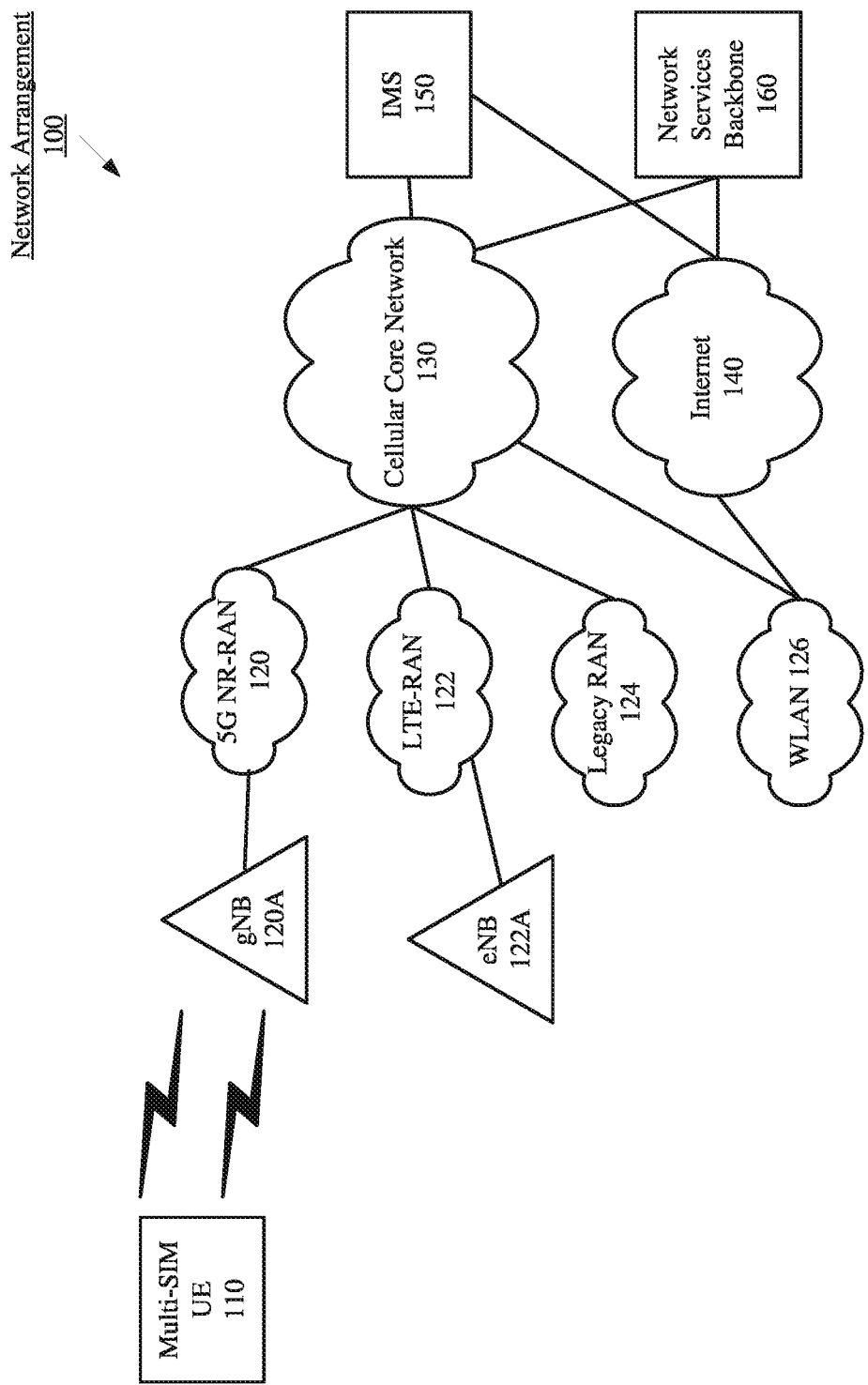
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for a user equipment (UE) to implement one or more scheduling gaps (SGs) in its operations with a first network to temporarily tune away from the first network to perform operations on a second network. As will be described below, the exemplary embodiments relate to a UE equipped with multiple subscriber identification modules (SIMs).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

Throughout this description, the UE is characterized as a multi-SIM UE. The term "multi-SIM UE" may refer to a UE equipped with multiple (e.g., two or more) SIMs. Each SIM may be used to establish an independent network connection and each network connection may exist simultaneously. Thus, each SIM may be associated with its own telephone number and/or subscription with a cellular service provider. Accordingly, a single UE may be associated with two or more telephone numbers and/or subscriptions. Throughout this description, for the purposes of differentiating between SIMs, reference will be made to SIM A and SIM B. However, this is only intended to differentiate between the two SIMs and is not intended to indicate any sort of priority/preference between either SIM A or SIM B. In addition, the SIM A, SIM B, NW A and NW B are described only for illustrative purposes, and the principles described in the present disclosure may be applied to any number of SIM and network combinations.

A person of ordinary skill in the art would understand that a SIM contains information that is used by the UE to establish a network connection. For example, the SIM may include an international mobile subscriber identifier (IMSI) that may be used for authentication with the network provider. A user may have a first subscription with a cellular service provider that is enabled by SIM A and a second subscription with the cellular service provider that is enabled by SIM B. The network to which the UE may connect using SIM A may be referred to as network A (NW A) and the network to which the UE may connect using SIM B may be referred to as network B (NW B). In one example, the same cellular service provider is associated with both SIM A and SIM B. In another example, a different cellular service provider is associated with each SIM. Reference to any particular type of information being included in a SIM is merely provided for illustrative purposes. A SIM may include a wide variety of different types of information that different networks or entities may refer to by different names. Accordingly, the exemplary embodiments may apply to a SIM that contains any type of information used by the multi-SIM UE to establish a network connection.

The exemplary embodiments will be described with respect to a multi-SIM UE equipped with two SIMs, e.g., SIM A and SIM B. However, those skilled in the art will understand that the exemplary embodiments may also apply to devices that have more than two SIMs.

The multi-SIM UE may utilize the same hardware, software and/or firmware components to perform operations related to the network connection associated with SIM A and the network connection associated with SIM B. For example, the multi-SIM UE may be configured to use the same transceiver to perform operations related to both network connections. Using the same component to perform operations for both network connections may create a scenario in which the multi-SIM UE is unable to perform an operation related to the network connection associated with one of SIM A or SIM B because the multi-SIM UE is currently using that component to perform an operation related to the network connection associated with the other SIM.

During RRC CONNECTED operation with NW A, the multi-SIM UE may be in the RRC INACTIVE or RRC IDLE state on NW B. The exemplary embodiments describe operations for configuring a scheduling gap (SG) on NW A so that the UE may temporarily tune away from NW A to perform operations on NW B. During the SG, the UE may maintain the RRC CONNECTED state on NW A so that, when the UE re-tunes to NW A after the SG duration, the UE and NW A may resume normal RRC CONNECTED operations without requiring a transition back into the RRC CONNECTED state from either the RRC IDLE or RRC INACTIVE state.

FIG. 1 shows a network arrangement 100 according to the exemplary embodiments. The network arrangement 100 includes a multi-SIM UE 110 that includes at least two SIMs. Those skilled in the art will understand that the multi-SIM UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single multi-SIM UE 110 is only provided for illustrative purposes.

The multi-SIM UE 110 may communicate with one or more networks. In the example of the network configuration 100, the networks with which the multi-SIM UE 110 may wirelessly communicate are a 5G New Radio (NR) radio access network (5G NR-RAN) 120, an LTE radio access network (LTE-RAN) 122, a legacy access network (legacy RAN) and wireless local access network (WLAN) 126. However, the multi-SIM UE 110 may also communicate with other types of networks and the multi-SIM UE 110 may also communicate with networks over a wired connection. Therefore, the multi-SIM UE 110 may include a 5G NR chipset to communicate with the 5G NR-RAN 120, an LTE chipset to communicate with the LTE-RAN 122, a legacy chipset to communicate with the legacy RAN 124 and an ISM chipset to communicate with the WLAN 126.

The multi-SIM UE 110 may establish multiple independent network connections that may exist simultaneously. For example, the multi-SIM UE 110 may establish a first network connection using SIM A and a second network connection with a network using SIM B. The first network connection and the second network connection may be independent from one another and exist simultaneously. In the example of the network configuration 100, the multi-SIM UE 110 is camped on the gNB 120A of the 5G NR-RAN 120 for the first network connection and on the eNB 122A of the LTE-RAN 122 for the second network connection. However, this is merely provided for illustrative purposes. For example, the multi-SIM UE 110 may establish first and second network connections to the 5G NR-RAN 120 via the gNB 120A. In another example, the multi-SIM UE 110 may establish a first network connection to the 5G NR-RAN 120 via the gNB 120A and a second network connection to the legacy RAN 124 via a corresponding base station 124A. Thus, in an actual network arrangement, the multi-SIM UE 110 may camp on a first cell corresponding to a first network for the first network connection and a second cell corresponding to a second network for the second network connection.

The 5G NR-RAN 120, the LTE-RAN 122 and the legacy RAN 124 may be portions of cellular networks that may be deployed by cellular providers (e.g., Verizon, AT&T, T-Mobile, etc.). These networks 120, 122, 124 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 126 may include any type of wireless local area network (WiFi, Hot Spot, IEEE 802.11x networks, etc.).

The base stations (e.g., the gNB 120A, the eNB 122A, the base station 124A) may include one or more communication interfaces to exchange data and/or information with camped UEs, the corresponding RAN, the cellular core network 130, the internet 140, etc. Further, the base stations may include a processor configured to perform various operations. For example, the processor of the base station may be configured to perform operations related to paging. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the multi-SIM UE 110 to connect to the 5G NR-RAN 120, the LTE-RAN 122 and the legacy RAN 124. To provide an example, the 5G NR-RAN 120 may be associated with a particular cellular service provider where the multi-SIM UE 110 and/or the user thereof has a contract and credential information (e.g., stored on each of SIM A and SIM B). In the case of the multi-SIM UE 110, each SIM will independently connect to the corresponding network. Upon detecting the presence of the 5G NR-RAN 120, the multi-SIM UE 110 may transmit the corresponding credential information to associate with the 5G NR-RAN 120. More specifically, the multi-SIM UE 110 may associate with a specific cell (e.g., the gNB 120A of the 5G NR-RAN 120). Similar association procedures may be performed for the multi-SIM UE 110 to connect to the LTE-RAN 122 and the legacy RAN 124.

In addition to the networks 120, 122, 124 and 126 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the multi-SIM UE 110 using the IP protocol. The IMS 150 may communicate with the cellular core network 130 and the Internet 140 to provide the multimedia services to the multi-SIM UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the multi-SIM UE 110 in communication with the various networks.

Figure 2:
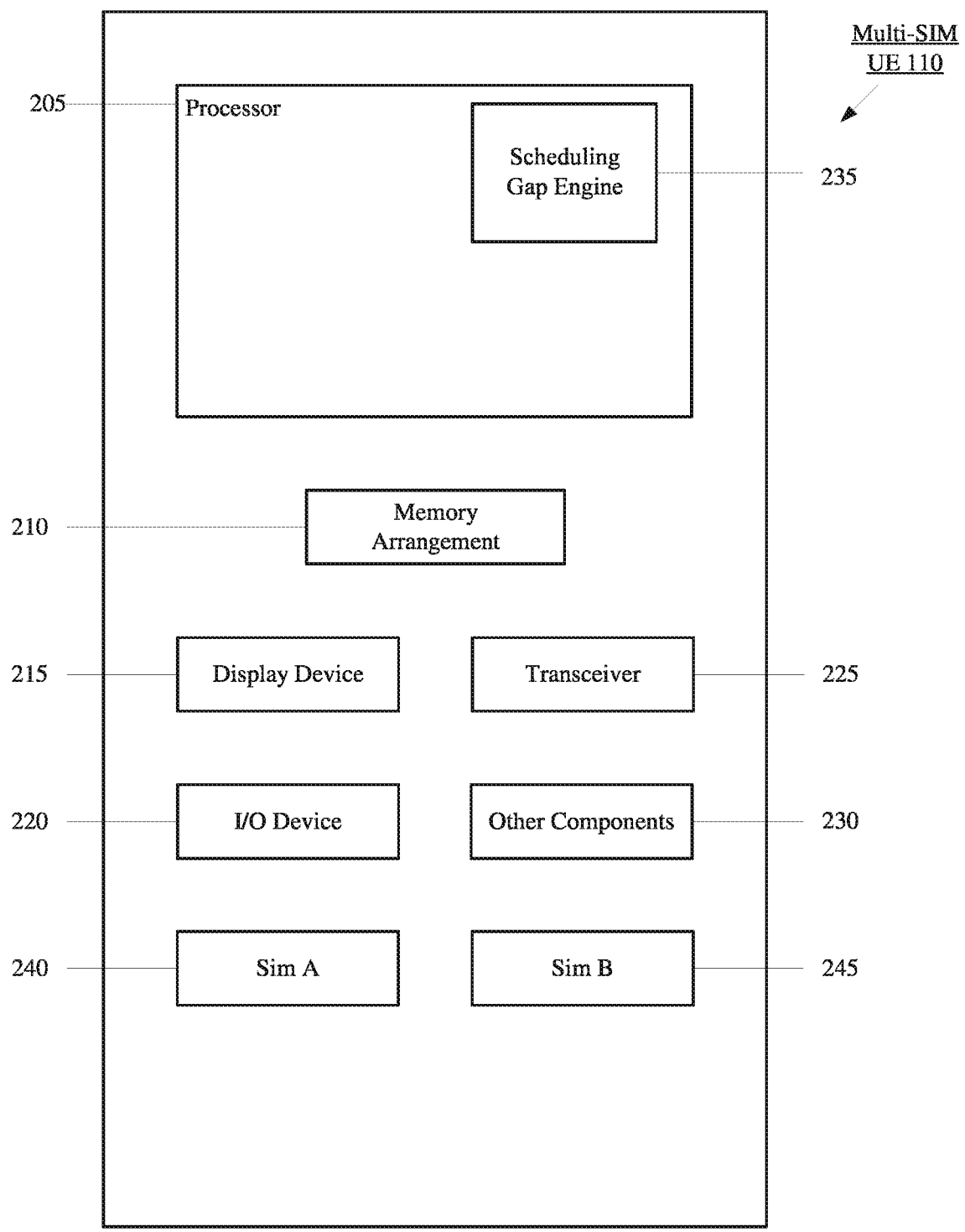
FIG. 2 shows an exemplary multi-SIM UE according to various exemplary embodiments.

FIG. 2 shows an exemplary multi-SIM UE 110 according to various exemplary embodiments. The multi-SIM UE 110 will be described with regard to the network arrangement 100 of FIG. 1. The multi-SIM UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the multi-SIM UE 110 to other electronic devices, sensors to detect conditions of the UE 110, etc. The multi-SIM UE 110 may include SIM A 240 and a SIM B 245. However, as mentioned above, the exemplary embodiments may apply to a UE equipped with more than two SIMs.

The processor 205 may be configured to execute a plurality of engines for the multi-SIM UE 110. For example, the engines may include a scheduling gap engine 235. The scheduling gap engine 235 may perform operations for configuring a scheduling gap (SG) for network operations, wherein, during the SG, the UE 110 may temporarily tune away from a current network connection to perform operations on a second network. Examples of these operations will be described in greater detail below.

The above referenced engine being an application (e.g., a program) executed by the processor 205 is only exemplary. The functionality associated with the engine may also be represented as a separate incorporated component of the multi-SIM UE 110 or may be a modular component coupled to the multi-SIM UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the multi-SIM UE 110. As will be described in further detail below, the memory 210 may store data associated with the conditions of the multi-SIM UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the LTE-RAN 122, the legacy RAN 124 and the WLAN 126, etc. Accordingly, the transceiver 225 may operate on a variety of different frequencies or channels (e.g., set of consecutive frequencies).

Figure 3:
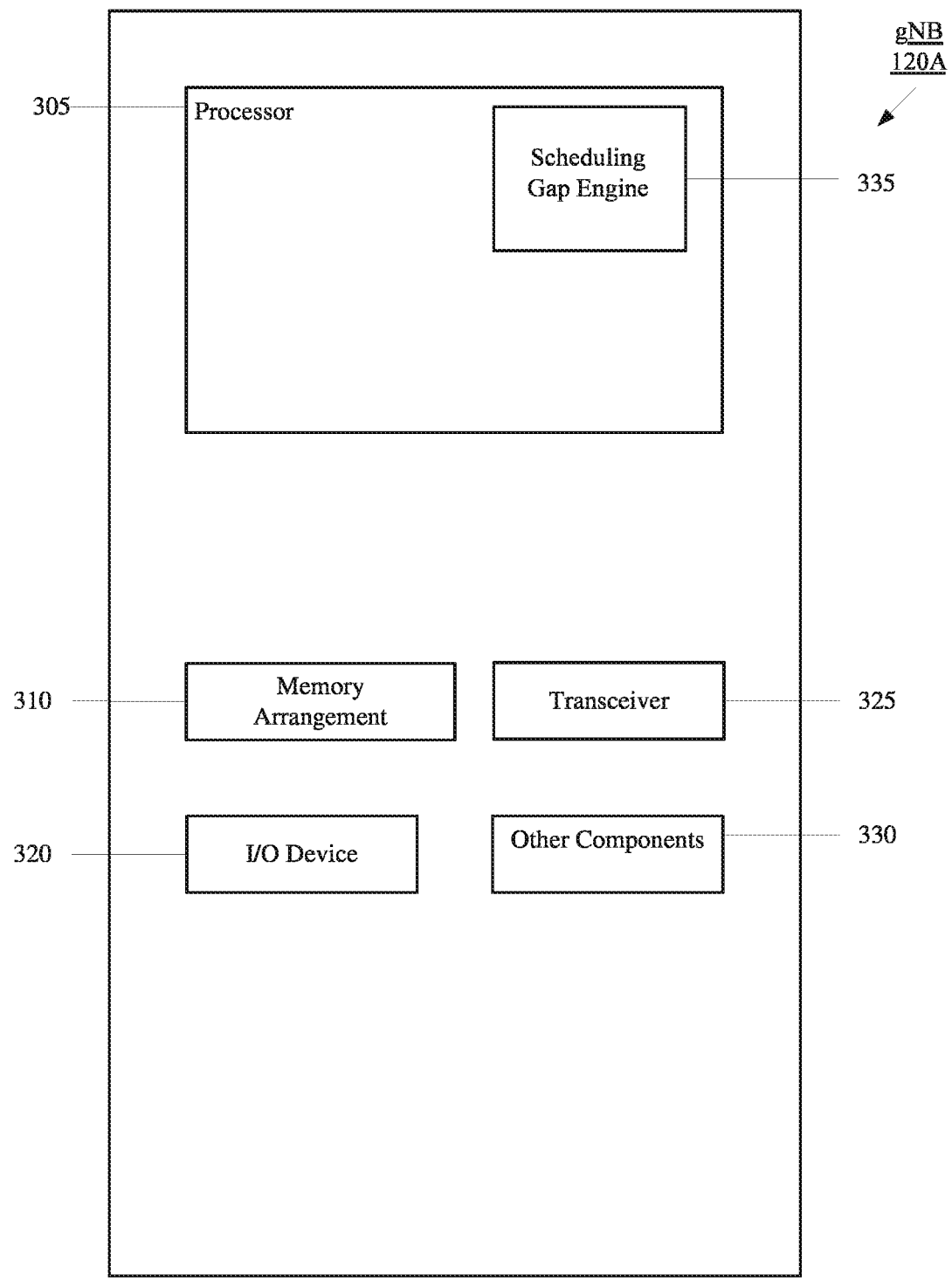
FIG. 3 shows an exemplary network base station according to various exemplary embodiments.

FIG. 3 shows an exemplary network cell, in this case gNB 120A, according to various exemplary aspects. As noted above with regard to the UE 110, the gNB 120A may represent a serving cell for the UE 110. The gNB 120A may represent any access node of the 5G NR network through which the UE 110 may establish a connection and manage network operations.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a scheduling gap engine 335 for performing operations including configuring a scheduling gap (SG) for the UE 110, wherein, during the SG, the UE 110 may temporarily tune away from a current network connection to perform operations on a second network. Examples of these operations will be described in greater detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

The radio resource control (RRC) protocol comprises a state machine defining an operating state for a UE, each state having different radio resources associated therewith. In 5G NR and in LTE, the RRC states include the RRC CONNECTED state, the RRC INACTIVE state, and the RRC IDLE state. The UE enters into the RRC IDLE state upon powering up, and may perform operations including receiving broadcast messages, receiving paging messages, PLMN selection, and cell re-selection mobility. While in the RRC IDLE state, the UE follows a discontinuous reception (DRX) cycle for periodically waking up to listen for paging messages from the network. The UE may perform an initial access operation, including a random access (RACH) procedure, to camp on a network cell and enter the RRC connected state to establish a network connection and exchange transmissions with the network. If, while in the RRC CONNECTED state, there is no traffic to the UE or from the UE for some predefined period of time, the network may suspend the RRC connection and instruct the UE to enter the RRC INACTIVE state. In the RRC INACTIVE state, the UE may perform similar operations as in the RRC IDLE state. Additionally, the access stratum (AS) context may be saved at the UE and the network, allowing the UE to quickly re-enter the RRC CONNECTED state using a resume procedure when network activity for the UE is received at the UE/network.

The following two scenarios may be encountered by a multi-sim UE (MUSIM UE) with respect to dynamic switching between two camped networks A and B (NW A and NW B). In a first scenario, the UE is in the RRC CONNECTED state on NW A and seeks to perform a network switch to NW B without leaving the RRC CONNECTED state on NW A. In a second scenario, the UE is in the RRC CONNECTED state on NW A and seeks to perform a network switch to NW B that involves leaving the RRC CONNECTED state on NW A. In the second scenario, the use case necessitates that the UE establish an RRC connection on NW B.

With regard to the first scenario, the network switching between NW A and NW B, without leaving the RRC CONNECTED state on NW A, can be achieved by creating Scheduling Gaps (SGs) on NW A. The SG provides a mechanism between the multi-SIM UE and NW A for the UE to temporarily switch from its operation on NW A to do some other protocol activity on NW B. During the switch period defined by the SG, NW A stops scheduling resources (DL and UL) to the multi-SIM UE. The UE performs operations with NW B and, at the end of the SG, switches back to NW A. When the multi-SIM UE switches back to NW A, the UE may resume normal RRC CONNECTED mode operation with NW A. In this approach, the switching of the MUSIM UE from NW A to NW B and back to NW A is coordinated with NW A.

Figure 4:
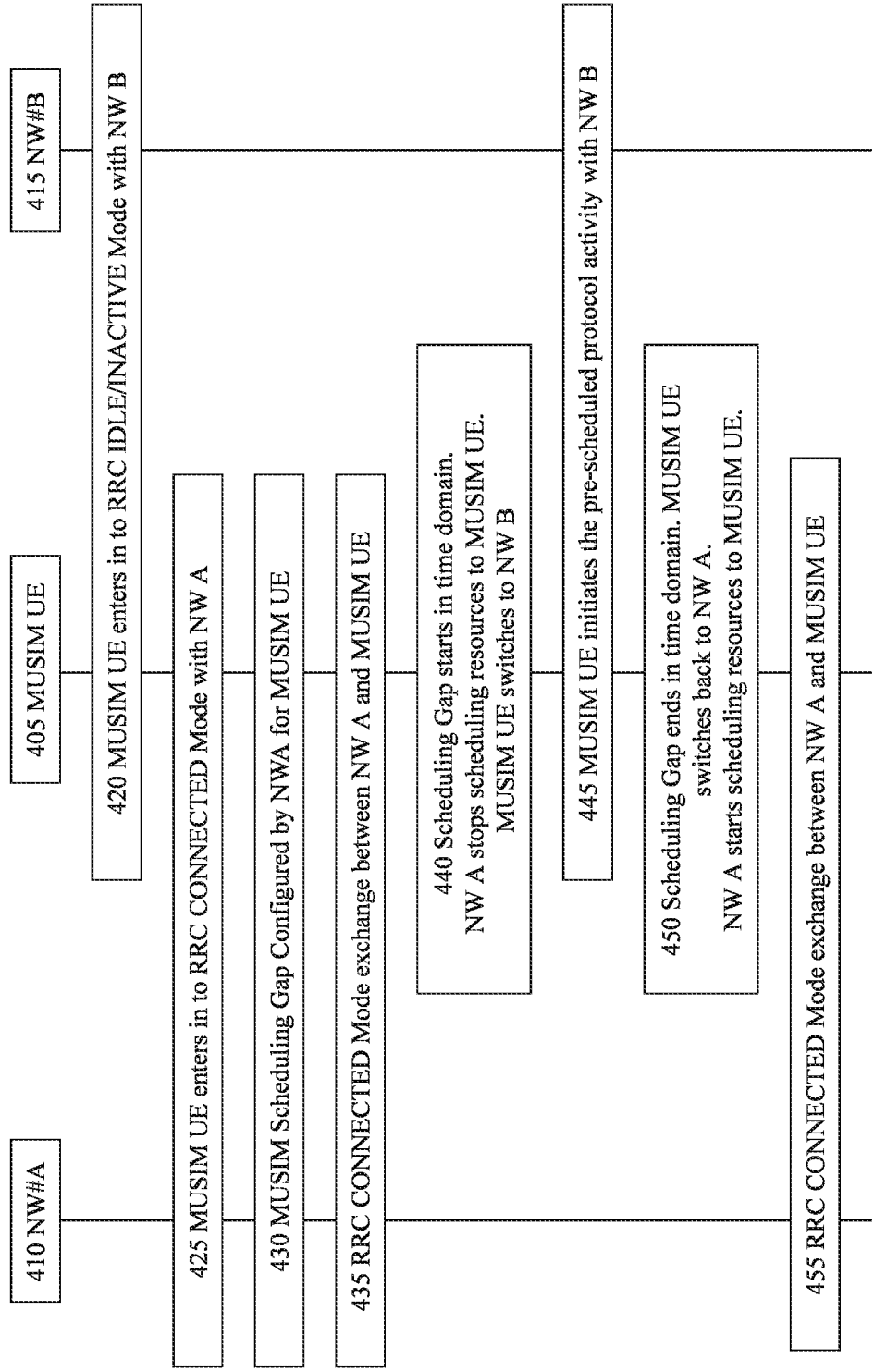
FIG. 4 shows an exemplary signaling diagram for scheduling gap (SG) operations according to various exemplary embodiments.

FIG. 4 shows an exemplary signaling diagram 400 for scheduling gap (SG) operations according to various exemplary embodiments described herein. The signaling diagram 400 includes a multi-SIM UE 405 performing operations with a first network (NW A) 410 and a second network (NW B) 415. As described above, the NW A 410 may refer to a network with which the UE 405 has a subscription that is enabled by a first SIM (SIM A), and the NW B 415 may refer to a network with which the UE 405 has a subscription that is enabled by a second SIM (SIM B). The NW A 410 and the NW B 415 may refer to a same network or different networks (e.g., PLMNs). The UE 405 may represent the multi-SIM UE 110 described above with regard to FIG. 1. The NW A 410 and NW B 415 may refer to the 5G NR-RAN 120, which may be accessed by the UE 405 via the gNB 120A. Alternatively, the NW A 410 and NW B 415 may be accessed by the UE 405 via different gNBs. Further, the NW A 410 and NW B 415 may refer to different networks which may be accessed by the UE via the same access node or different access nodes.

In 420, the UE 405 enters the RRC IDLE state or RRC INACTIVE state with NW B 415. For example, the UE 405 may have previously been in the RRC CONNECTED state with NW B 415 and transitioned to the IDLE/INACTIVE state, or the SIM B used to connect to NW B may have been recently activated.

In 425, the UE 405 enters the RRC CONNECTED state with NW A 410. The step 425 requires the UE 405 to tune to NW A 410 to perform the network operations with NW A 410 to establish the RRC connection. As part of the initial registration procedure, the UE 405 may report to NW A 410 a UE capability for network switching. Additionally, as part of an initial RACH procedure, a resume procedure, or a reconfiguration procedure, the UE may request a scheduling gap (SG) configuration from the NW A 410, to be described in further detail below.

In 430, the NW A 410 configures a scheduling gap (SG) for the UE 405. As will be described in further detail below, the SG may be requested by the UE. The request may include only an indication that the SG is needed, or may include additional parameters for the SG, including a type of SG (periodic/aperiodic) and timing aspects for the SG. In one embodiment, the network configures a set of SGs, wherein one or more of the configured SGs may be activated by the UE based on the use case for operations to be performed on NW B.

In 435, the UE 405 and the NW A 410 perform communications exchanges while in the RRC CONNECTED state, during the duration of time prior to the start of the SG.

In 440, the SG begins in the time domain. During the agreed SG, the NW A 410 does not schedule any resources for the UE 405 to transmit/receive data with NW A 410 during the SG. The multi-SIM UE 405 tunes away from NW A 410 to NW B 415 but maintains the RRC CONNECTED state with NW A 410.

In 445, the UE 405 performs the pre-scheduled protocol activity with NW B 415 during the SG. These activities may involve, for example, listening for paging messages, performing mobility measurements, receiving system information (SI) broadcasts, etc., to be described in further detail below. Notably, in this example, the UE 405 does not enter the RRC CONNECTED state on NW B 415 but remains in the RRC INACTIVE or RRC IDLE state on NW B 415. If the RRC CONNECTED state is to be entered into on NW B 415, and the MUSIM UE does not possess two independent Rx and Tx capabilities (e.g., is a dual Rx/single Tx or single Rx/single Tx UE), then the RRC connection on NW A is released. If the MUSIM UE possesses dual Rx/dual Tx capabilities, then the RRC CONNECTED state may be maintained on NW A even when the RRC CONNECTED state is entered on NW B.

In 450, the SG ends in the time domain. The multi-SIM UE 405 tunes away from NW B 415 to NW A 410. In 455, after re-tuning to the NW A 410, the NW A 410 resumes scheduling resources for the UE 405 in the RRC CONNECTED state.

Different types of scheduling gaps (SGs) may be configured based on the reason for which the UE is triggered to switch networks from NW A to NW B. A first type of SG is a periodic SG involving only Rx activity on the NW B, and not involving any Tx activity on NW B. For example, during the first type of SG, the UE may perform IDLE/INACTIVE page monitoring on NW B. In another example, the UE may perform primary serving cell (PCell) or neighbor cell (NCell) measurements (inter-frequency, intra-frequency or inter-RAT) on NW B. A second type of SG is an aperiodic SG involving only Rx activity and not involving any Tx activity on NW B. For example, during the second type of SG, the UE may perform single shot measurements, a PLMN search, or SI acquisition on NW B. A third type of SG is an aperiodic SG involving both Tx and Rx activity where the UE does not enter the RRC CONNECTED state on NW B. For example, during the third type of SG, the UE may perform on-demand SI acquisition on NW B. A fourth type of SG is an aperiodic SG involving both Tx and Rx activity wherein the UE enters the RRC CONNECTED state on NW B. For example, during the fourth type of SG, the UE may perform periodic TAU/RNAU signaling, send a BUSY Indication, etc. When the UE enters the RRC CONNECTED state on NW B, the UE exits the RRC CONNECTED state on NW A.

The UE may perform various types of operations on NW B, as described above. The exemplary embodiments described herein relate to signaling schemes for configuring a scheduling gap on NW A based on various use cases for NW B.

According to some exemplary embodiments, the UE transmits a request for a scheduling gap (SC) to the first network (e.g., NW A), e.g., indicates to the first network a need for a SG. In response, the first network may configure a set of SGs for the UE, wherein the UE may activate one or more of the SGs based on its intended use case with the second network (e.g., NW B).

The type of message used by the UE to indicate the need for the SG may depend on the current RRC state of the UE with the network. If the UE is entering the CONNECTED state from the IDLE state, e.g., performing a RACH procedure with the network, the UE may indicate the need for the SG in an RRCSetupRequest message (Msg3). If the UE is entering the CONNECTED state from the INACTIVE state, e.g., resuming the RRC connection, the UE may indicate the need for the SG in an RRCResumeRequest message. If the UE is already in the CONNECTED state, the UE may indicate the need for the SG in a UEAssistanceInformation message. In any of these cases, the UE may indicate additional information regarding the intended use case on NW B, e.g., the IDLE/INACTIVE DRX length on NW B. However, in consideration of the limited space available in the RRCSetupRequest and the RRCResumeRequest, it may be more practical to signal only the need for the SG (comprising a single bit) in these two message types.

As part of the network configuration of the SG, to be described in further detail below, a prohibit timer may be defined to ensure reasonable usage of this SG request from UE to the network. Until the prohibit timer expires, the UE may not reinitiate a scheduling gap request to the network. Once the prohibit timer expires, if the network has still not configured the expected SG for the UE, then the UE is allowed to re-request a SC. The newly requested SG can either be the same as the previous request or may include new parameters to request for a new SG configuration.

After the SG pattern request is received by the network, the network may configure a set of SGs, with each gap configuration uniquely identified by a gap ID. This configuration may be sent as part of response to the request message, for example as an RRCSetup message (in response to the RRCSetupRequest message), an RRCResume message (in response to the RRCResumeRequest message), or an RRCReconfiguration message (in response to the UEAssistanceInformation message).

Figure 5:
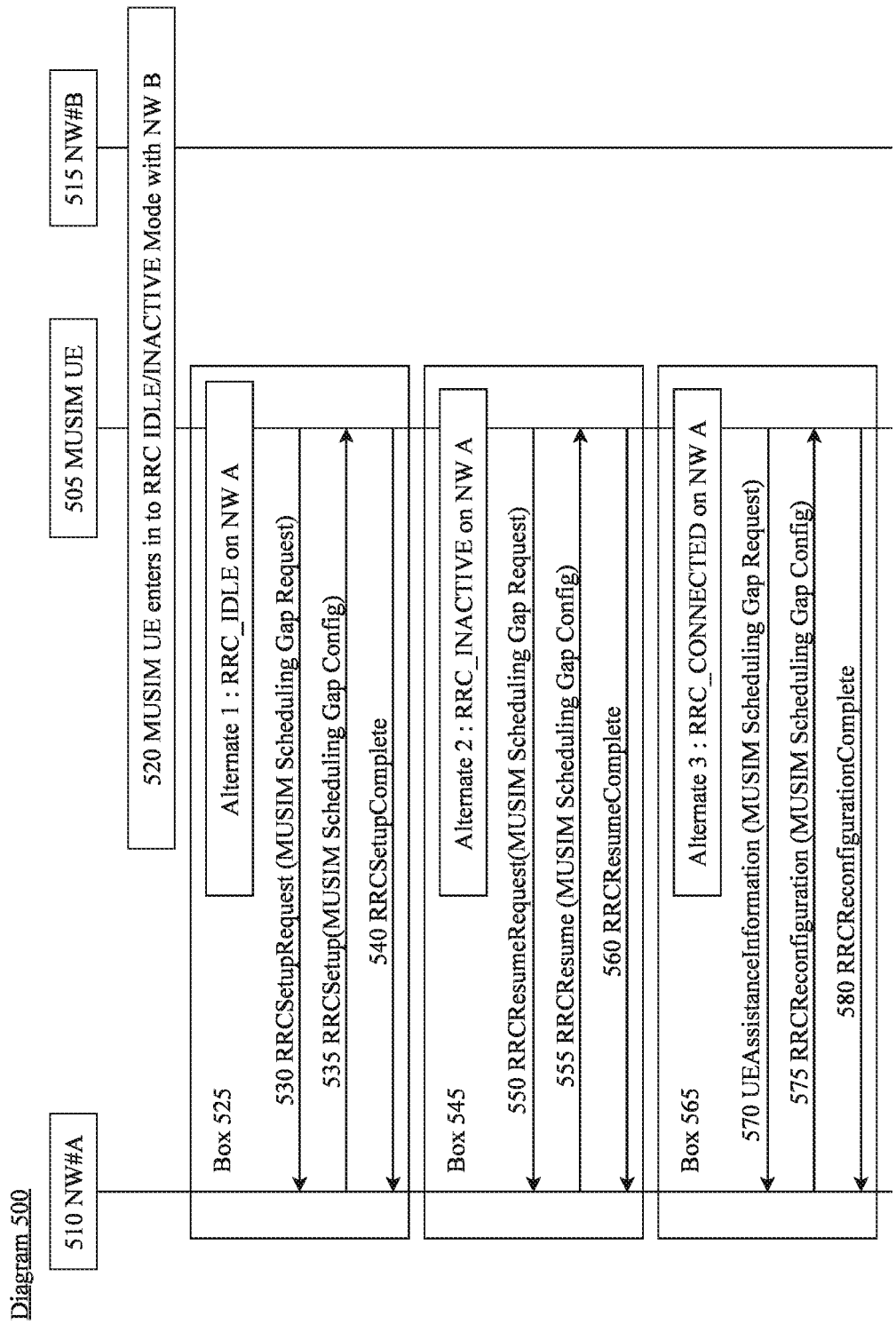
FIG. 5 shows an exemplary signaling diagram for scheduling gap (SG) configuration according to a first option according to various exemplary embodiments.

FIG. 5 shows an exemplary signaling diagram 500 for scheduling gap (SG) configuration according to a first option. Similar to the signaling diagram 400, the signaling diagram 500 includes a multi-SIM UE 505 performing operations with a first network (NW A) 510 and a second network (NW B) 515. As described above, the NW A 510 may refer to a network with which the UE 505 has a subscription that is enabled by a first SIM (SIM A), and the NW B 515 may refer to a network with which the UE 505 has a subscription that is enabled by a second SIM (SIM B), wherein the NW A 510 and the NW B 515 may refer to a same network or different networks accessed by the UE 505.

In 520, similar to 420, the UE 505 enters the RRC IDLE state or RRC INACTIVE state with NW B 515.

Box 525 represents a method for configuring one or more SGs for the UE 505 according to a first alternative, wherein the CE 505 starts in the IDLE state on NW A 510, as described above. In 530, the UE 505, as part of a RACH procedure, sends to NW A 510 a multi-SIM (MUSIM) scheduling gap (SG) request as part of an RRCSetupRequest message (Msg3). In 535, the UE 505 receives from NW A 510 a MUSIM SG configuration as a part of an RRCSetup message (Msg4). In 540, the UE 505 sends an RRCSetupComplete message on uplink resources assigned by NW A 510 and is in the RRC CONNECTED state.

Box 545 represents a method for configuring one or more SGs for the UE 505 according to a second alternative, wherein the UE 505 starts in the INACTIVE state on NW A 510, as described above. In 550, the UE 505 in the INACTIVE state sends to NW A 510 a MUSIM SG request as part of an RRCResumeRequest message. In 555, the UE 505 receives from NW A 510 a MUSIM SG configuration as a part of an RRCResume message. In 560, the UE 505 sends an RRCResumeComplete message on uplink resources assigned by NW A 510 and is in the RRC CONNECTED state.

Box 565 represents a method for configuring one or more SGs for the UE 505 according to a third alternative, wherein the UE 505 starts in the CONNECTED state on NW A 510, as described above. In 570, the UE 505 sends to NW A 510 a MUSIM SG request as part of a UEAssistanceInformation message. In the SG request, the UE 505 may include parameters related to an intended use case on NW B, e.g., DRX cycle information. In 575, the UE 505 receives from NW A 510 a MUSIM SG configuration as a part of an RRCReconfiguration message. In 580, the UE 505 sends an RRCReconfigurationComplete message on uplink resources assigned by NW A 510 and remains in the RRC CONNECTED state.

The scheduling gap(s) configured by the network may include the following information: the type of SG (e.g., periodic or aperiodic (one-shot)), the SG timing advance, and the SG length. Additionally, when the SG is periodic, the periodicity for the SG is configured. Each of the gap configurations is associated with a unique gap ID, e.g., gap ID 1, gap ID 2, etc. As described above, the SG configuration may also include parameters defining a prohibit timer.

The MUSIM Scheduling Gap Configuration may comprise the following information elements. It is noted that the values used are empirical only, and actual values used may be different.

```
MUSIMSchedulingGapConfig :: = SEQUENCE {
SchedulingGapPeriodic SEQUENCE OF PeriodicGap of size M,
SchedulingGapAperiodic SEQUENCE OF AperiodicGap of size N
}
PeriodicGap :: = SEQUENCE {
PeriodicGapID gapId, /* Unique value within this array of size M
*/
SchedulingGapAdvance value {0 ms, 0.25 ms, 0.5 ms, ...},
SchedulingGapLength value {1 ms, 2 ms, ...}
SchedulingGapPeriodicity value {320 ms, 640 ms, 1280 ms, 2560
ms.}
}
AperiodicGap :: = SEQUENCE {
AperiodicGapID gapId, /* Unique value within this array of size
N */
SchedulingGapAdvance value {0 ms, 0.25 ms, 0.5 ms, ...},
SchedulingGapLength value {1 ms, 2 ms, ...}
}
```

After the set of SGs are configured for the UE, while the UE is in the RRC CONNECTED state on the network, the UE ascertains suitable gap(s) from the set of available SGs (periodic and/or aperiodic) configured by the network based on its current use case on NW B. The UE may activate the selected gap(s) in at least the following two ways. In some embodiments, the gap(s) may be indicated as part of a UEAssistanceInformation message, wherein the gap IDs for the chosen SG configurations are included in the message. The network acknowledges to the UE the current set of SG configurations that are active as part of an RRCReconfiguration message. In other embodiments, the gap(s) may be indicated in an uplink (UL) medium access control (MAC) control element (CE), wherein the gap IDs for the chosen SG configurations are included in the message. The network acknowledges to the UE the current set of SG configurations that are active in a downlink (DL) MAC CE. These exemplary UL and DL MAC CEs may be added to existing CE definitions, or new MAC CEs may be defined for this purpose.

Figure 6:
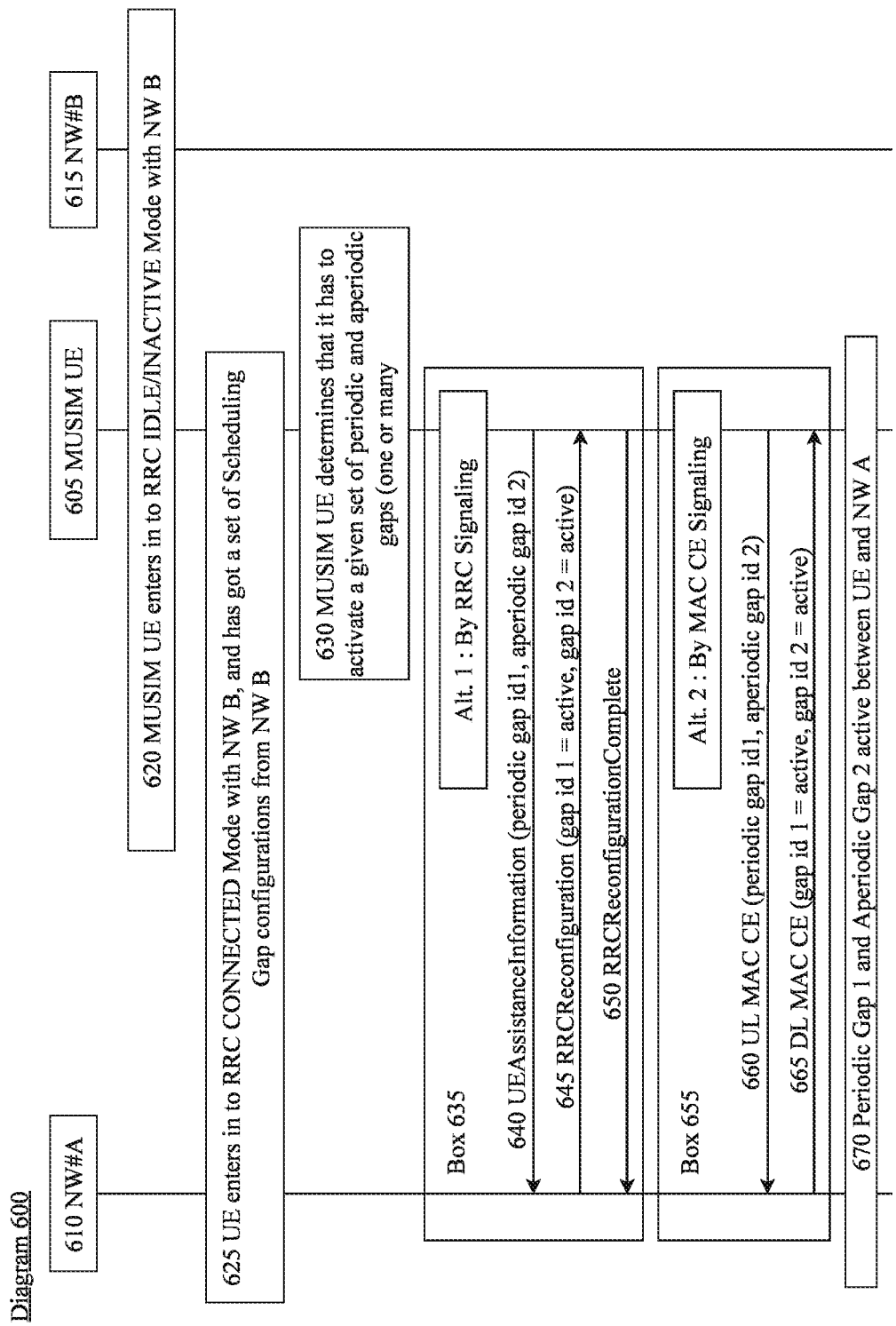
FIG. 6 shows an exemplary signaling diagram for scheduling gap (SG) activation according to a first option according to various exemplary embodiments.

FIG. 6 shows an exemplary signaling diagram 600 for scheduling gap (SG) activation according to a first option. Similar to the previous methods, the signaling diagram 600 includes a multi-SIM UE 605 performing operations with a first network (NW A) 610 and a second network (NW B) 615. As described above, the NW A 610 may refer to a network with which the UE 605 has a subscription that is enabled by a first SIM (SIM A), and the NW B 615 may refer to a network with which the UE 605 has a subscription that is enabled by a second SIM (SIM B), wherein the NW A 610 and the NW B 615 may refer to a same network or different networks accessed by the UE 605.

In 620, similar to the previous methods, the UE 605 enters the RRC IDLE state or RRC INACTIVE state with NW B 615. In 625, the UE 605 enters the RRC CONNECTED state with NW A 610 and is configured with a set of SG configurations, e.g., according to one of the three options discussed above with respect to FIG. 5.

In 630, the UE 605 determines which one(s) of the set of SG configurations to activate based on a current use case for NW B 615. In the example of FIG. 6, the UE 605 determines that a periodic gap with ID 1 should be activated, e.g., to listen for paging messages, and that an aperiodic gap with ID 2 should be activated, e.g., for SI acquisition.

Box 635 represents a method for activating one or more SGs for the UE 605 according to a first alternative, wherein the UE 605 in the CONNECTED state uses RRC signaling to request the selected gaps, as described above. In 640, the UE 605 sends to NW A 610 the gap IDs for the selected gaps as part of a UEAssistanceInformation message. In 645, the UE 605 receives from NW A 610 the gap IDs for the selected SGs as a confirmation for the selected SGs as a part of an RRCReconfiguration message. In 650, the UE 605 sends an RRCReconfigurationComplete message on uplink resources assigned by NW A 610.

Box 655 represents a method for activating one or more SGs for the UE 605 according to a second alternative, wherein the UE 605 in the CONNECTED state uses a MAC CE to request the selected gaps, as described above. In 660, the UE 605 sends to NW A 610 the gap IDs for the selected gaps as part of an UL MAC CE. In 665, the UE 605 receives from NW A 610 the gap IDs for the selected SGs as a confirmation for the selected SGs as a part of a DL MAC CE.

In 670, the UE 605 and the NW A 610 operate in accordance with the activated SGs. For example, as described above, the NW A 610 does not schedule any resources for the UE 605 to transmit/receive data with NW A 610 during the activated SG(s). The multi-SIM UE 605 tunes away from NW A 610 to NW B 615 but maintains the RRC CONNECTED state with NW A 610. The UE 605 performs the pre-scheduled protocol activity with NW B 615 during the SG(s).

According to other exemplary embodiments, a multi-SIM UE determines a desired SG pattern based on its current use case on NW B. Relative to the exemplary embodiments described above where the multi-SIM UE requests for a scheduling gap and provides the input parameters for the NW A to compute the scheduling gap, in these exemplary embodiments, the multi-SIM UE determines the scheduling gap pattern based on the IDLE/INACTIVE DRX configuration of the NW B. It is noted that these exemplary embodiments are applicable for a UE already in the RRC CONNECTED state on NW A.

According to the second embodiment, the multi-SIM UE sends a UEAssistanceInformation message to the network, e.g., NW A, indicating the preferred Scheduling Gap based on the intended use case with a second network, e.g., NW B. The UE may provide the following information: the type of SG (e.g., periodic or aperiodic (one-shot)), the SG timing advance, the SG length, or any other parameter for characterizing the SG. Additionally, when the SG is periodic, the periodicity for the SG may be indicated. The UE may indicate a set of gap configurations, each being associated with a unique gap ID.

Similar to the first embodiment, a prohibit timer is defined to ensure reasonable usage of this scheduling gap request from the UE. The network, upon receiving the scheduling gap pattern from UE, may send a RRCReconfiguration message indicating that it is acknowledging the scheduling gap pattern from the MUSIM UE. In another option, the network may use a DL MAC CE to confirm the SG pattern(s) requested by the UE.

Figure 7:
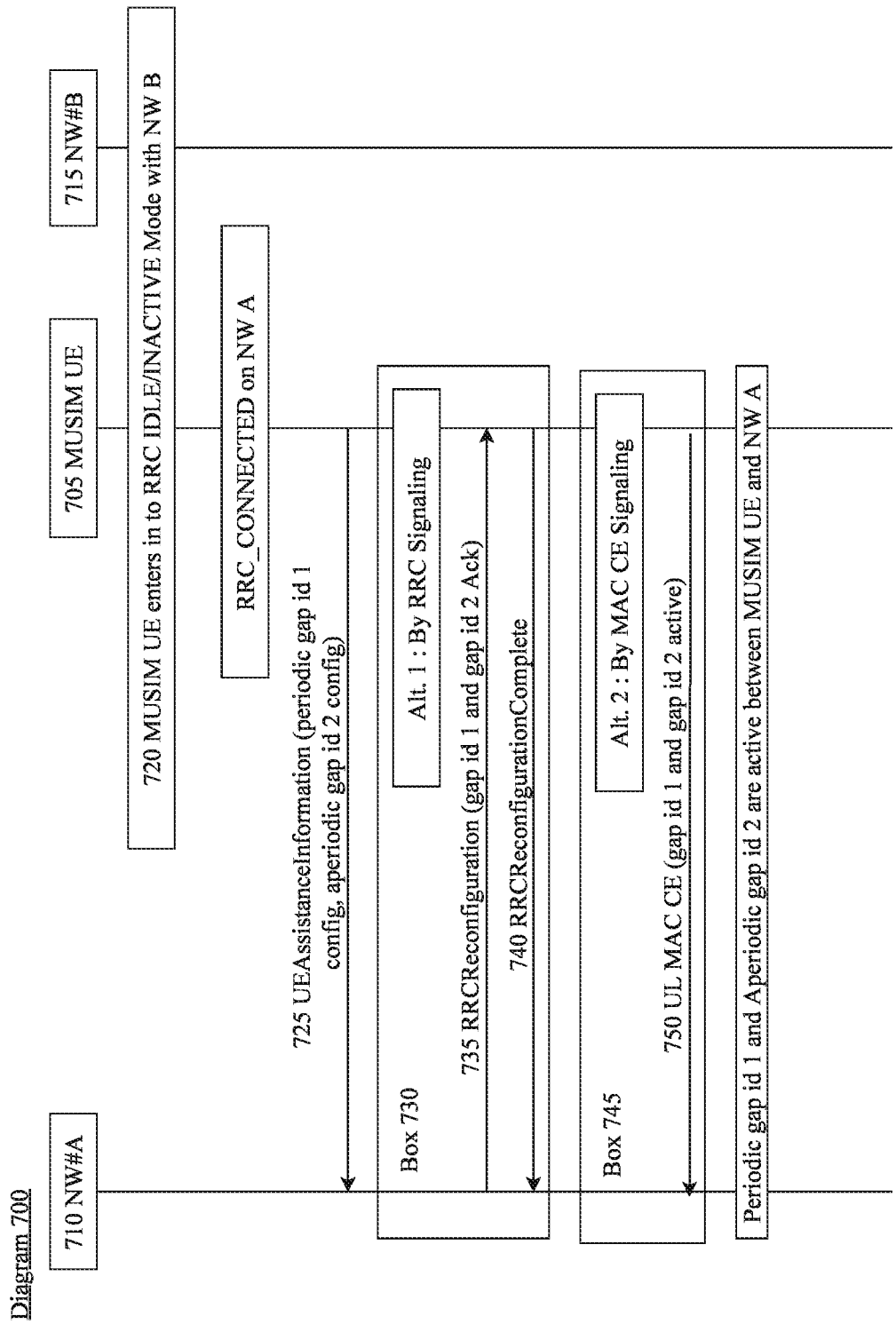
FIG. 7 shows a signaling diagram for scheduling gap configuration and activation according to a second option according to various exemplary embodiments.

FIG. 7 shows a signaling diagram 700 for scheduling gap configuration and activation according to a second option. Similar to the previous methods, the signaling diagram 700 includes a multi-SIM UE 705 performing operations with a first network (NW A) 710 and a second network (NW B) 715. In 720, similar to the previous methods, the UE 705 enters the RRC IDLE state or RRC INACTIVE state with NW B 715.

In 725, the UE 705 enters the RRC CONNECTED state with NW A 710 and sends to NW A 710 one or more SG configurations and associated gap IDs as part of a UEAssistanceInformation message.

Box 730 represents a first method for confirming the SG configurations requested by the UE 705, according to the first option discussed above. In 735, the UE 705 receives from NW A 710 the gap IDs for the requested SGs as a confirmation for the requested SGs as a part of an RRCReconfiguration message. In 740, the UE 705 sends an RRCReconfigurationComplete message on uplink resources assigned by NW A 710 to activate the requested SGs.

Box 745 represents a second method for confirming the SG configurations requested by the UE 705, according to the second option discussed above. In 750, the UE 705 transmits to NW A 710 the gap IDs for the requested SGs to activate the requested SGs. In 755, the UE 705 receives from NW A 710 the gap IDs for the requested SGs as a confirmation for the requested SGs as a part of a downlink MAC CE.

With respect to the operation of the prohibit timer, relative to the aforementioned embodiments, the timer may be configured initially by the network as part of any CONNECTED state configuration, e.g., an RRCConnectionReconfiguration. The reconfig message may indicate a timer value, e.g., T_MUSIM_SG_PROHIBIT, having a value in seconds, e.g., 1 s, 2 s, 5 s, 30 s, 60 s, etc., wherein specification may indicate a list of valid timer values and the reconfig message indicates one value from the set.

The MUSIM UE may advertise, as part of UE capability signaling to, for example, NR or LTE, its MUSIM capability and capability for SG requests. The network may then indicate its support of SG request handling for MUSIM purposes for the UE by configuring the prohibit timer value. The presence of this timer value from network to UE implies that the network allows the UE to request for SG configuration according to UE need. The absence of this timer value from the network to UE implies that the network does not allow the UE to request for MUSIM SG Configuration.

During its RRC CONNECTED mode of operation, the UE may determine the need to request for scheduling gap to NW A, based on some impending activity on NW B. After the UE sends the request for the SG to NW A (either as a request for SG config according to the first exemplary embodiment or when sending the SG configuration as in the second exemplary embodiment), the UE then starts the T_MUSIM_SG_PROHIBIT. While the T_MUSIM_SG_PROHIBIT is running, the UE does not retransmit the previous SG request, and waits for the NW to provide the SG configuration (first embodiment) or acknowledgment that the requested scheduling gap configuration is active (second embodiment).

In one scenario, once the T_MUSIM_SG_PROHIBIT expires, and the UE has not yet gotten the SG configuration from the NW A, the UE is then allowed to re-request for either the same MUSIM SG configuration or a different SG configuration, and restarts T_MUSIM_SG_PROHIBIT timer. In another scenario, if NW A has provided the requested SG configuration, if T_MUSIM_SG_PROHIBIT is running, then the UE stops T_MUSIM_SG_PROHIBIT.

According to a further embodiment, the UE, while in the RRC CONNECTED state on NW A, is able to request to cancel a previously requested SG when it is no longer required. For example, when the UE loses service on NW B, the IDLE/INACTIVE DRX monitoring periodic SG is no longer required. While in the RRC CONNECTED state on NW A, the NW A can reconfigure the set of available SGs. In such cases, the UE has to delete the previously stored set of SGs and store the new set of SGs. It is noted that the described SG deactivation may be used regardless of the method used for configuring/activating the SG, as described in the first and second exemplary embodiments above.

Figure 8:
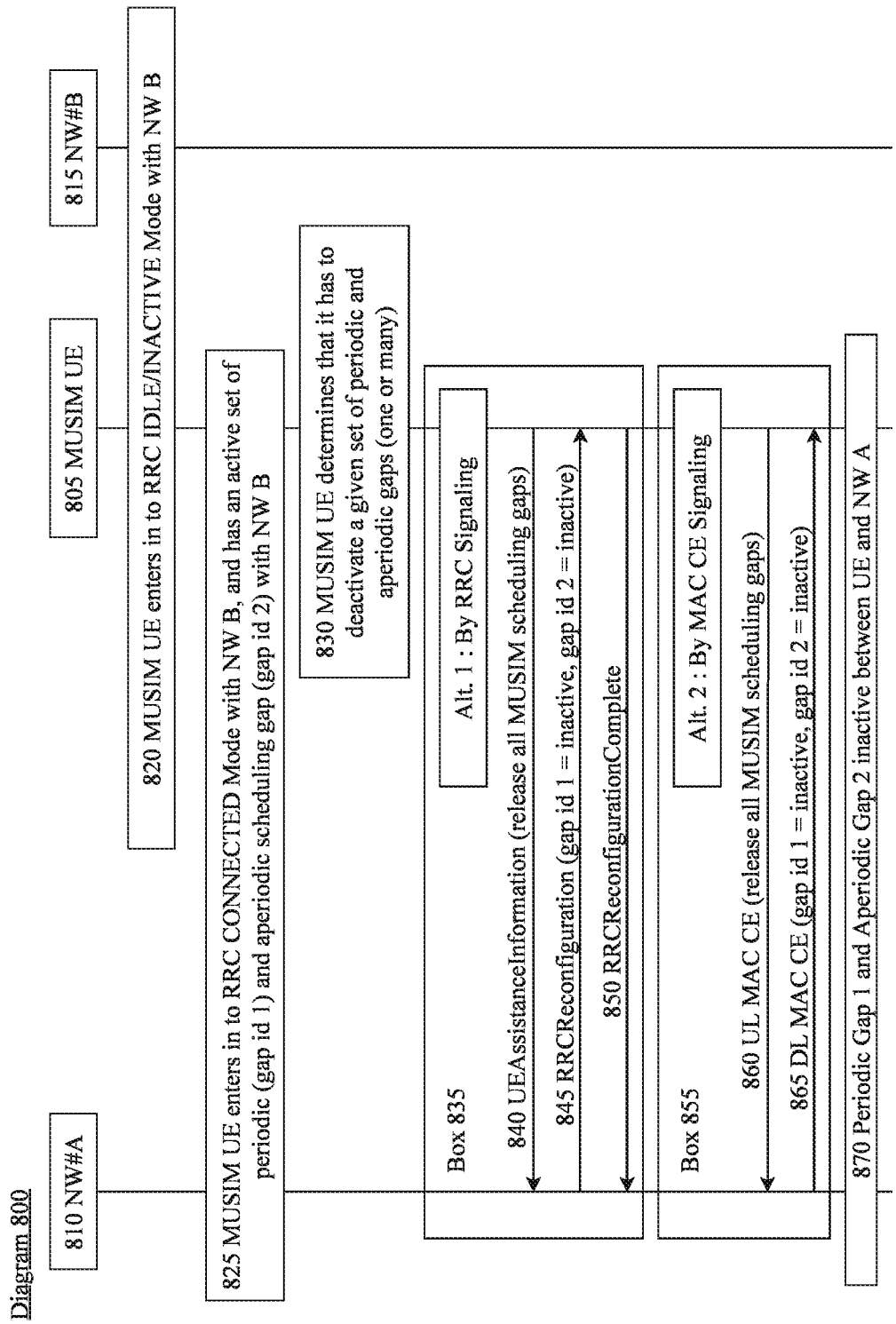
FIG. 8 shows a signaling diagram for deactivating a scheduling gap according to various exemplary embodiments.

FIG. 8 shows a signaling diagram 800 for deactivating a scheduling gap according to various exemplary embodiments described herein. Similar to the previous methods, the signaling diagram 800 includes a multi-SIM UE 805 performing operations with a first network (NW A) 810 and a second network (NW B) 815.

In 820, similar to the previous methods, the UE 805 enters the RRC IDLE state or RRC INACTIVE state with NW B 815. In 825, the UE 805 enters the RRC CONNECTED state with NW A 810 and is configured with a set of SG configurations, e.g., according to one of the three options discussed above with respect to FIG. 5.

In 830, the UE 805 determines which one(s) of the set of activated SG configurations are to be deactivated based on a current use case for NW B 815. In the example of FIG. 8, the UE 805 determines that a periodic gap with ID 1 should be deactivated and that an aperiodic gap with ID 2 should be deactivated. However, the UE 805 may determine to deactivate a subset of the configured SGs. For example, the UE 805 may determine that the SG with ID 1 should be deactivated, but the SG with ID 2 should remain activated.

Box 835 represents a method for deactivating one or more SGs for the UE 805 according to a first alternative, wherein the UE 805 in the CONNECTED state uses RRC signaling to request the deactivation of the selected gaps. In 840, the UE 805 sends to NW A 810 the gap IDs for the selected gaps to deactivate as part of a UEAssistanceInformation message. In 845, the UE 805 receives from NW A 810 the gap IDs for the selected SGs as a confirmation for the deactivation of the selected SGs as a part of an RRCReconfiguration message. In 850, the UE 805 sends an RRCReconfigurationComplete message on uplink resources assigned by NW A 810.

Box 855 represents a method for deactivating one or more SGs for the UE 805 according to a second alternative, wherein the UE 805 in the CONNECTED state uses a MAC CE to request the deactivation of the selected gaps, as described above. In 860, the UE 805 sends to NW A 810 the gap IDs for the selected gaps to deactivate as part of an UL MAC CE. In 865, the UE 805 receives from NW A 810 the gap IDs for the selected SGs as a confirmation for the deactivation of the selected SGs as a part of a DL MAC CE.

In 870, the UE 805 and the NW A 810 operate in accordance with the deactivated SGs. For example, normal operation on NW A 810, without any SGs, may be resumed.

Figure 9:
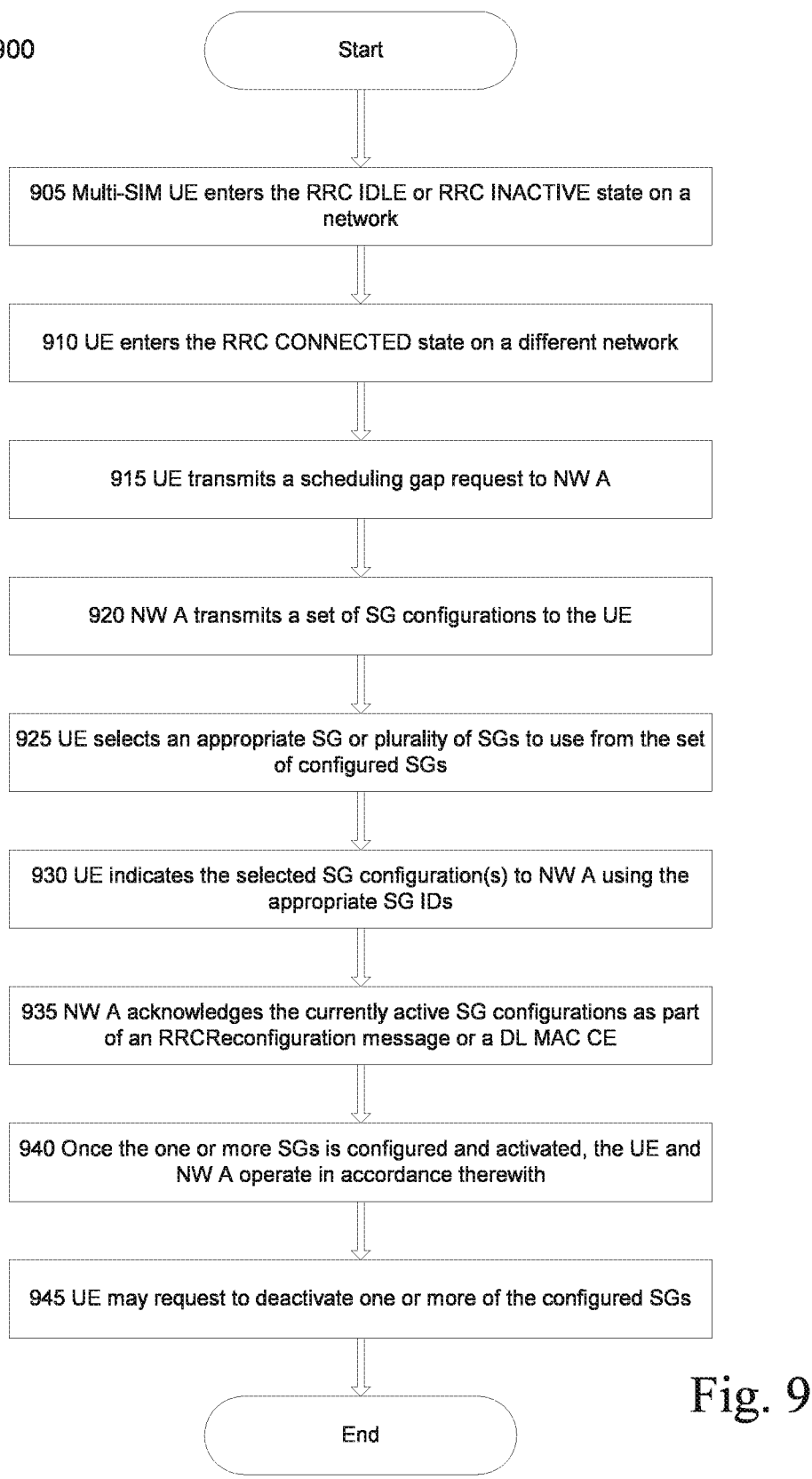
FIG. 9 shows a first exemplary method for scheduling gap configuration and activation/deactivation according to various exemplary embodiments.

FIG. 9 shows a first exemplary method 900 for scheduling gap configuration and activation/deactivation according to various exemplary embodiments described herein.

In 905, the multi-SIM UE enters the RRC IDLE or RRC INACTIVE state on a network, e.g., NW B. In 910, the UE enters the RRC CONNECTED state on a different network, e.g., NW A. During the transition into the RRC CONNECTED state, or at any time prior to the current transition into the CONNECTED state, the UE indicates to NW A, a multi-SIM capability for implementing a scheduling gap (SG) as part of UE capability signaling. The NW A may configure for the UE a prohibit timer to be implemented if and when the UE transmits a scheduling gap request.

In 915, according to the first embodiment described above, the UE transmits a scheduling gap request to NW A. As described above, this SG request may be transmitted during the UE transition to the CONNECTED state on NW A, e.g., in an RRCSetupRequest message (when the UE begins in the IDLE state on NW A) or in an RRCResumeRequest message (when the UE begins in the INACTIVE state on NW A). If the UE is already in the CONNECTED state, the SG request may be transmitted in a UEAssistanceInformation message. The UE may start the prohibit timer after sending the request.

In 920, NW A transmits a set of SG configurations to the UE. Each of the SG configurations comprises information for the respective SG, including the type of SG (periodic/aperiodic), the SG timing advance, the SG length, and a periodicity for the SG (only when the SG is periodic). Each of the SG configurations is associated with a unique SG identifier (ID). In the exemplary method 900, it is assumed that the SG configuration is performed prior to the expiration of the prohibit timer.

In 925, the UE selects, based on the current use case for NW B operations, an appropriate SG or plurality of SGs to use from the set of configured SGs. In 930, the UE indicates, as a part of UEAssistanceInformation or in a MAC CE, the selected SG configuration(s) to NW A using the appropriate SG IDs. In 935, the NW A acknowledges the currently active SG configurations as part of an RRCReconfiguration message or a DL MAC CE.

In 940, once the one or more SGs is configured and activated, the UE and NW A operate in accordance therewith. For example, the UE may periodically or aperiodically tune away from NW A during the SG duration to perform operations on NW B. At the end of the SG, the UE re-tunes to NW A and remains in the RRC CONNECTED state on NW A.

In 945, the UE may request to deactivate one or more of the configured SGs. Similar to the activation procedure described above, the UE may determine which SGs to deactivate and transmit a deactivation request to the network in a UEAssistanceInformation message or MAC CE including the SG IDs for the desired SGs to deactivate. The NW A may confirm the deactivation in an RRCReconfiguration message or DL MAC CE.

Figure 10:
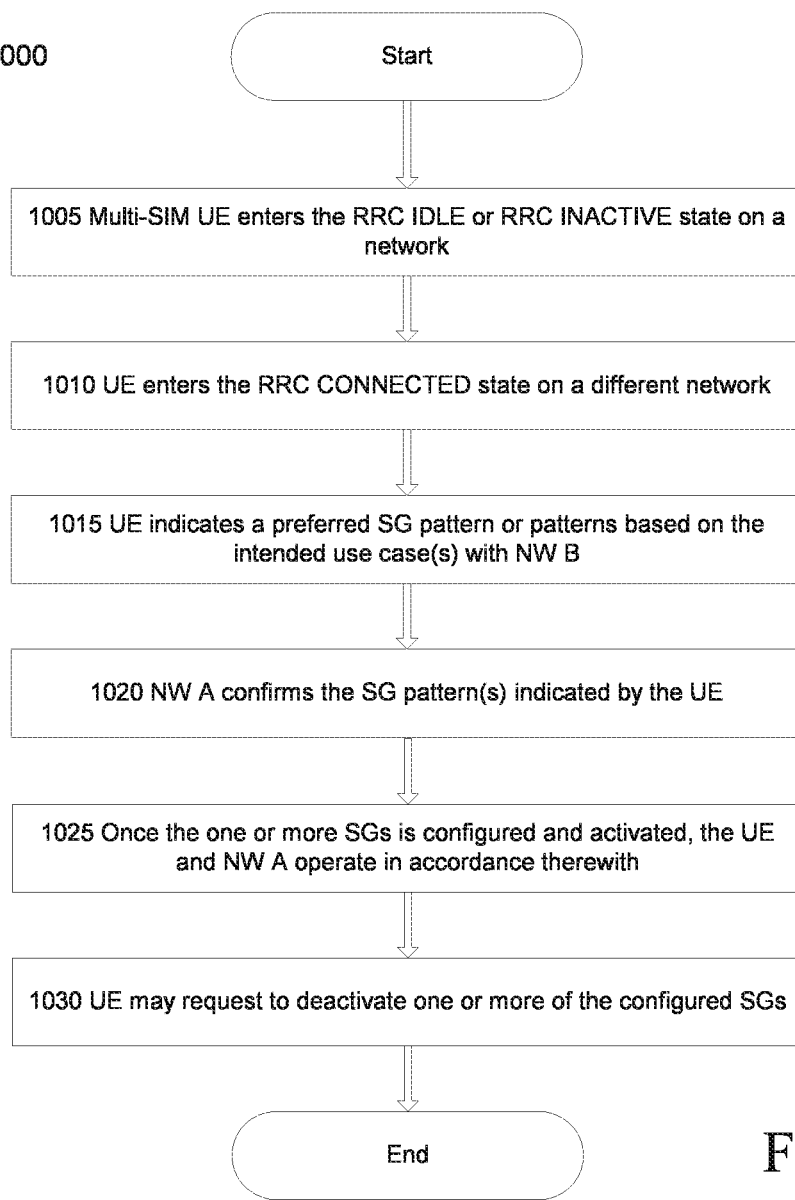
FIG. 10 shows a second exemplary method for scheduling gap configuration and activation/deactivation according to various exemplary embodiments.

FIG. 10 shows a second exemplary method 1000 for scheduling gap configuration and activation/deactivation according to various exemplary embodiments described herein.

In 1005, the multi-SIM UE enters the RRC IDLE or RRC INACTIVE state on a network, e.g., NW B. In 1010, the UE enters the RRC CONNECTED state on a different network, e.g., NW A. During the transition into the RRC CONNECTED state, or at any time prior to the current transition into the CONNECTED state, the UE indicates to NW A, a multi-SIM capability for implementing a scheduling gap (SG) as part of UE capability signaling. The NW A may configure for the UE a prohibit timer to be implemented if and when the UE transmits a scheduling gap request. In this exemplary embodiment, the UE may request a specific SG pattern or patterns, rather than leaving it to the NW A to configure a set of potential SG configurations.

In 1015, the UE indicates, as a part of UEAssistanceInformation, a preferred SG pattern or patterns based on the intended use case(s) with NW B. In the message, the UE includes the parameters for the SG(s) including the type of SG (periodic/aperiodic), the SC timing advance, the SG length, and a periodicity for the SG (only when the SG is periodic). Each of the SG pattern indications is associated with a unique SG identifier (ID).

In 1020, the NW A confirms the SG pattern(s) indicated by the UE. The NW A may provide such confirmation by including the requested gap IDs in an RRCReconfiguration message or in a DL MAC CE.

In 1025, once the one or more SGs is configured and activated, the UE and NW A operate in accordance therewith. For example, the UE may periodically or aperiodically tune away from NW A during the SG duration to perform operations on NW B. At the end of the SG, the UE re-tunes to NW A and remains in the RRC CONNECTED state on NW A.

In 1030, the UE may request to deactivate one or more of the configured SGs. Similar to the activation procedure described above, the UE may determine which SGs to deactivate and transmit a deactivation request to the network in a UEAssistanceInformation message or MAC CE including the SG IDs for the desired SGs to deactivate. The NW A may confirm the deactivation in an RRCReconfiguration message or DL MAC CE.

In some exemplary embodiments, a periodic SG may be configured by default by the network, i.e., without receiving an initial request by the UE. When the UE reports its SG capability to the network, the network may assume the need for the SG. After receiving the configuration, the UE may activate the periodic SG (by default) if it is, in fact, needed. Alternatively, if the multi-SIM UE is not currently using a second SIM on a second network, the UE may choose not to activate the configured SG.

In some scenarios, the multi-SIM UE may need to switch from NW A to NW B for a longer duration. Rather than maintaining the RRC CONNECTED state on NW A for the entirety of this duration, NW A may implement one or more implicit timers for transitioning from the RRC CONNECTED state to the RRC INACTIVE or RRC IDLE state on NW A.

NW A can configure for the UE a timer value which, if present, indicates to the UE that it can potentially transition to either the IDLE or INACTIVE state in case no response is received from NW A for the long switching request. For finer granularity, NW A may configure two timer values (T1 and T2), wherein T1 indicates an implicit transition from RRC CONNECTED to RRC INACTIVE and T2 indicates an implicit transition from RRC INACTIVE to RRC IDLE. If only one timer value (T) is configured, then it implies that NW A does not support the MUSIM UE to implicitly transition to RRC INACTIVE state and only allows the UE to go to RRC IDLE. NW A can configure the one or more timer values as part of the cell wide SI or on a per RRC CONNECTION basis.

EXAMPLES

In a first example, a processor of a user equipment (UE) is configured to perform operations including entering a radio resource control (RRC) CONNECTED state on a first network using a first subscriber identification module (SIM) and an RRC INACTIVE or RRC IDLE state on a second network using a second SIM, transmitting, to the first network, an indication of a capability for a scheduling gap (SG) configuration, wherein, during a duration of the SG, the first network avoids scheduling resources for the UE, receiving, from the first network, an indication of the SG configuration to be used, during the duration of the SG, tuning away from the first network to perform operations on the second network and after the duration of the SG, tuning back to the first network, wherein the RRC CONNECTED state is maintained on the first network during the duration of the SG.

In a second example, the processor of the first example, wherein the SG is periodic and is configured by the first network by default.

In a third example, a processor of a base station of a first network is configured to perform operations including entering a radio resource control (RRC) CONNECTED state with a user equipment, wherein the UE uses a first subscriber identification module (SIM) to access the first network, wherein the UE further enters an RRC INACTIVE or RRC IDLE state on a second network using a second SIM, receiving, from the UE, a request for a scheduling gap (SG) configuration, wherein, during a duration of the SG, the first network avoids scheduling resources for the UE, transmitting, to the UE, an indication of the SG configuration to be used, wherein, during the duration of the SG, the UE tunes away from the first network to perform operations on the second network and maintaining the RRC CONNECTED state with the UE during the duration of the SG.

In a fourth example, the processor of the third example, wherein the operations further comprise transmitting, to the UE, a configuration for a set of SGs, wherein the UE selects one or more of the configured SGs to be used based on the operations to be performed on the second network and receiving an indication from the UE of the selected SGs to activate the selected SGs.

In a fifth example, the processor of the fourth example, wherein the request transmitted by the UE is included in an RRCSetupRequest message and the configuration transmitted by the first network is included in an RRCSetup message.

In a sixth example, the processor of the fourth example, wherein the request transmitted by the UE is included in an RRCResumeRequest message and the configuration transmitted by the first network is included in an RRCResume message.

In a seventh example, the processor of the fourth example, wherein the request transmitted by the UE is included in an UEAssistanceInformation message and the configuration transmitted by the first network is included in an RRCReconfiguration message.

In an eighth example, the processor of the fourth example, wherein the transmitted configuration for the set of SGs includes an SG identifier (ID) associated with each of the SGs, wherein the selected SGs are indicated to the network using the SG IDs of the selected SGs.

In a ninth example, the processor of the fourth example, wherein the activation of the selected SGs is received in a UEAssistanceInformation message and the first network confirms the activation of the selected SGs in an RRCReconfiguration message.

In a tenth example, the processor of the fourth example, wherein the activation of the selected SGs is received in an uplink medium access control (MAC) control element (CE) and the first network confirms the activation of the selected SGs in a downlink MAC CE.

In an eleventh example, the processor of the third example, wherein the SG configuration includes a type of SG, a timing advance of the SG and a length of the SG, wherein the type of SG comprises either periodic or aperiodic.

In a twelfth example, the processor of the eleventh, wherein, when the type of SG is periodic, the SG configuration further includes a periodicity for the SG.

In a thirteenth example, the processor of the third example, wherein the operations further comprise configuring a timer for the UE wherein, during a duration of the timer, the UE avoids transmitting a further request for the SG.

In a fourteenth example, the processor of the thirteenth example, wherein the indication received by the first network of the SG configuration to be used includes the one or more SG IDs.

In a fifteenth example, the processor of the fourteenth example, wherein the request is included in a UEAssistanceInformation message and the indication transmitted by the first network is included in an RRCReconfiguration message.

In a sixteenth example, the processor of the fourteenth example, wherein the request is included in a UEAssistanceInformation message and the indication transmitted by the first network is included in a downlink medium access control (MAC) control element (CE).

In a seventeenth example, the processor of the thirteenth example, wherein the parameters for the SG include a type of SG, a timing advance of the SG and a length of the SG, wherein the type of SG comprises either periodic or aperiodic.

In an eighteenth example, the processor of the seventeenth example, wherein, when the type of SG is periodic, the SG parameters further include a periodicity for the SG.

In a nineteenth example, the processor of the thirteenth example, wherein the operations further comprise configuring a timer for the UE wherein, during a duration of the timer, the UE avoids transmitting a further request for the SG.

In a twentieth example, the processor of the third example, wherein the UE selects one or more of a set of configured SGs to be deactivated based on the operations to be performed on the second network, the operations further comprising receiving an indication from the UE of the selected SGs to deactivate the selected SGs.

In a twenty first example, the processor of the twentieth example, wherein the deactivation of the selected SGs is received in a UEAssistanceInformation message and the first network confirms the deactivation of the selected SGs in an RRCReconfiguration message.

In a twenty second example, the processor of the twentieth example, wherein the deactivation of the selected SGs is received in an uplink medium access control (MAC) control element (CE) and the first network confirms the deactivation of the selected SGs in a downlink MAC CE.

In a twenty third example, a processor of a base station of a first network is configured to perform operations including entering a radio resource control (RRC) CONNECTED state with a user equipment, wherein the UE uses a first subscriber identification module (SIM) to access the first network, wherein the UE further enters an RRC INACTIVE or RRC IDLE state on a second network using a second SIM, receiving, from the UE, an indication of a capability for a scheduling gap (SG) configuration, wherein, during a duration of the SG, the first network avoids scheduling resources for the UE, transmitting, to the UE, an indication of the SG configuration to be used, wherein, during the duration of the SG, the UE tunes away from the first network to perform operations on the second network and maintaining the RRC CONNECTED state with the UE during the duration of the SG.

In a twenty fourth example, the processor of the twenty third example, wherein the SG is periodic and is configured by the first network by default.

In a twenty fifth example, a processor of a user equipment (UE) is configured to perform operations including entering a radio resource control (RRC) CONNECTED state on a first network using a first subscriber identification module (SIM) and an RRC INACTIVE or RRC IDLE state on a second network using a second SIM, receiving, from the first network, a configuration for a first timer to be used when the UE tunes away from the first network, tuning away from the first network to perform operations on the second network and, when the UE tunes away from the first network, starting the first timer and if the first timer expires prior to the UE tuning back to the first network, when the UE tunes back to the first network, entering the RRC INACTIVE or RRC IDLE state on the first network.

In a twenty sixth example, the processor of the twenty fifth example, wherein the operations further include receiving, from the first network, a configuration for a second timer to be used when the UE tunes away from the first network, wherein the second timer is of a shorter duration than the first timer, if the second timer expires prior to the UE tuning back to the first network and the first timer has not yet expired, when the UE tunes back to the first network, entering the RRC INACTIVE state on the first network and if the first timer expires prior to the UE tuning back to the first network, when the UE tunes back to the first network, entering the RRC IDLE state on the first network.

In a twenty seventh example, the processor of the twenty fifth example, wherein the first timer configuration is received in a system information (SI) broadcast or via RRC signaling.

In a twenty eighth example, a processor of a base station of a first network is configured to perform operations including entering a radio resource control (RRC) CONNECTED state with a user equipment, wherein the UE uses a first subscriber identification module (SIM) to access the first network, wherein the UE further enters an RRC INACTIVE or RRC IDLE state on a second network using a second SIM, transmitting, to the UE, a configuration for a first timer to be used when the UE tunes away from the first network to perform operations on the second network wherein, if the first timer expires prior to the UE tuning back to the first network, when the UE tunes back to the first network, the UE enters the RRC INACTIVE or RRC IDLE state on the first network.

In a twenty ninth example, the processor of the twenty eighth example, wherein the operations further include transmitting, to the UE, a configuration for a second timer to be used when the UE tunes away from the first network, wherein the second timer is of a shorter duration than the first timer, wherein, if the second timer expires prior to the UE tuning back to the first network and the first timer has not yet expired, when the UE tunes back to the first network, the UE enters the RRC INACTIVE state on the first network and if the first timer expires prior to the UE tuning back to the first network, when the UE tunes back to the first network, the UE enters the RRC IDLE state on the first network.

In a thirtieth example, the processor of the twenty eighth example, wherein the first timer configuration is transmitted in a system information (SI) broadcast or via RRC signaling.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations including:
   entering a radio resource control (RRC) CONNECTED state on a first network using a first subscriber identification module (SIM) and an RRC INACTIVE or RRC IDLE state on a second network using a second SIM;
   generating, for transmission to the first network, UEAssistanceInformation message comprising scheduling gap (SG) configuration information, wherein, during a duration of the SG, the first network avoids scheduling resources for the UE;

receiving, from the first network, a prohibit timer configuration, wherein during a duration of the prohibit timer, the UE avoids transmitting further UEAssistanceInformation messages comprising further SG configuration information;

receiving, from the first network, an indication of a SG configuration to be used;

during the duration of the SG, tuning away from the first network to perform operations on the second network; and after the duration of the SG, tuning back to the first network, wherein the RRC CONNECTED state is maintained on the first network during the duration of the SG.

2. The processor of claim 1, wherein the operations further comprise:

receiving, from the first network, a configuration for a set of SGs;

selecting one or more of the configured SGs to be used based on the operations to be performed on the second network; and generating, for transmission to the first network, an indication of the selected SGs to activate the selected SGs.

3. The processor of claim 2, wherein the indication of the SG configuration to be used is included in an RRCSetup message.

4. The processor of claim 2, wherein the indication of the SG configuration to be used is included in an RRCResume message.

5. The processor of claim 2, wherein the indication of the SG configuration to be used is included in an RRCReconfiguration message.

6. The processor of claim 2, wherein the UEAssistanceInformation includes an indication of the operations to be performed on the second network.

7. The processor of claim 2, wherein the received configuration for the set of SGs includes an SG identifier (ID) associated with each of the SGs, wherein the selected SGs are indicated to the network using the SG IDs of the selected SGs.

8. The processor of claim 2, wherein the activation of the selected SGs is transmitted in the UEAssistanceInformation message.

9. The processor of claim 2, wherein the activation of the selected SGs is transmitted in an uplink medium access control (MAC) control element (CE) and the first network confirms the activation of the selected SGs in a downlink MAC CE.

10. The processor of claim 1, wherein the indication of the SG configuration to be used includes a type of SG, a timing advance of the SG and a length of the SG, wherein the type of SG comprises either periodic or aperiodic.

11. The processor of claim 10, wherein, when the type of SG is periodic, the SG configuration further includes a periodicity for the SG.

12. The processor of claim 1, wherein the UEAssitanceInformation includes parameters for one or more SGs, wherein each SG is associated with an SG identifier (ID).

13. The processor of claim 12, wherein the indication of the SG configuration to be used includes the one or more SG IDs.

14. The processor of claim 13, wherein the indication of the SG configuration to be used is included in an RRCReconfiguration message.

15. The processor of claim 13, wherein the indication of the SG configuration to be used is included in a downlink medium access control (MAC) control element (CE).

16. The processor of claim 12, wherein the parameters for the SG include a type of SG, a timing advance of the SG and a length of the SG, wherein the type of SG comprises either periodic or aperiodic.

17. The processor of claim 16, wherein, when the type of SG is periodic, the SG parameters further include a periodicity for the SG.

18. A user equipment (UE), comprising:

a first subscriber identification module (SIM) associated with a first network;

a second SIM associated with a second network;

a transceiver configured to communicate with the first network using credentials associated with the first SIM and communicate with the second network using credentials associated with the second SIM; and a processor communicatively coupled to the transceiver and configured to perform operations comprising:

entering a radio resource control (RRC) CONNECTED state on the first network and an RRC INACTIVE or RRC IDLE state on the second network;

generating, for transmission to the first network, UEAssistanceInformation message comprising scheduling gap (SG) configuration information, wherein, during a duration of the SG, the first network avoids scheduling resources for the UE;

receiving, from the first network, a prohibit timer configuration, wherein during a duration of the prohibit timer, the UE avoids transmitting further UEAssistanceInformation messages comprising further SG configuration information;

receiving, from the first network, an indication of a SG configuration to be used;

during the duration of the SG, tuning away from the first network to perform operations on the second network; and after the duration of the SG, tuning back to the first network, wherein the RRC CONNECTED state is maintained on the first network during the duration of the SG.

* * * * *